United States Patent
Marlow et al.

(10) Patent No.: US 9,763,067 B2
(45) Date of Patent: Sep. 12, 2017

(54) METHODS AND APPARATUS FOR LONG-SHORT WAVE, LOW-HIGH FREQUENCY RADIO SECURE MESSAGE SERVICE

(71) Applicant: Protected Mobility, LLC, Rockville, MD (US)

(72) Inventors: William J. Marlow, Herndon, VA (US); Robert Cichielo, Asbury, NJ (US); Paul Benware, Mendon, NY (US); Anthony Fascenda, Rockville, MD (US); Emil Sturniolo, Medina, OH (US)

(73) Assignee: Protected Mobility, LLC, McLean, VA (US)

( * ) Notice: Subject to any disclaimer, the term of this patent is extended or adjusted under 35 U.S.C. 154(b) by 344 days.

(21) Appl. No.: 14/289,363

(22) Filed: May 28, 2014

(65) Prior Publication Data

US 2016/0249189 A1    Aug. 25, 2016

Related U.S. Application Data

(60) Provisional application No. 61/828,005, filed on May 28, 2013, provisional application No. 61/969,591, filed on Mar. 24, 2014.

(51) Int. Cl.
*H04W 4/14*   (2009.01)
*H04W 12/02*  (2009.01)
(Continued)

(52) U.S. Cl.
CPC ........... *H04W 4/14* (2013.01); *H04L 63/0492* (2013.01); *H04W 4/12* (2013.01); *H04W 12/02* (2013.01); *H04M 1/72552* (2013.01)

(58) Field of Classification Search
CPC .... H04W 4/14; H04W 12/02; H04L 63/0492; H04M 1/72552
See application file for complete search history.

(56) References Cited

U.S. PATENT DOCUMENTS 5,592,555 A    1/1997  Stewart
5,640,442 A *  6/1997  Fitzgerald ........... H04W 72/085
                                                    340/7.21
(Continued)

FOREIGN PATENT DOCUMENTS

WO        01/95558 A1     12/2001
WO        WO2014011144  *  1/2014

OTHER PUBLICATIONS

Chapman, Mark T., "Hiding the Hidden: A Software System for Concealing Ciphertext as Innocuous Text," The University of Wisconsin-Milwaukee, 1998, Under the Supervision of Professor G. I. Davida, 83 pages.

(Continued)

*Primary Examiner* — Chuong A Ngo
(74) *Attorney, Agent, or Firm* — Nixon & Vanderhye P.C.

(57) ABSTRACT

Methods, apparatus, and systems for the enablement of sending and receiving encrypted messages over Long/Short Wave, Low, High, Very High, or Ultra High Frequency Radio (LSW/HFR) provide for an interconnect between short or other message transmission over LSW/HFR, and other terrestrial or satellite based digital communications systems.

16 Claims, 5 Drawing Sheets

LONG/SHORT WAVE/LOW/HIGH FREQUENCY RADIO
SECURE MESSAGE SERVICE TECHNOLOGY (51) Int. Cl.
*H04L 29/06* (2006.01)
*H04W 4/12* (2009.01)
*H04M 1/725* (2006.01)

(56) References Cited

U.S. PATENT DOCUMENTS

| | | | |
|---|---|---|---|
| 6,125,281 A | 9/2000 | Wells et al. | |
| 6,356,937 B1 | 3/2002 | Montville et al. | |
| 7,076,657 B2 | 7/2006 | Koukoulidis et al. | |
| 7,424,615 B1 | 9/2008 | Jalbert et al. | |
| 7,702,898 B2 | 4/2010 | Tan | |
| 8,064,606 B2 | 11/2011 | Schuba et al. | |
| 8,386,800 B2 | 2/2013 | Kocher et al. | |
| 8,464,061 B2 | 6/2013 | Bradley | |
| 2002/0123967 A1 | 9/2002 | Wang | |
| 2002/0141591 A1 | 10/2002 | Hawkes et al. | |
| 2003/0078058 A1 | 4/2003 | Vatanen et al. | |
| 2004/0171369 A1 | 9/2004 | Little et al. | |
| 2005/0081054 A1 | 4/2005 | Choo | |
| 2005/0232422 A1 | 10/2005 | Lin et al. | |
| 2006/0158460 A1 | 7/2006 | Uh | |
| 2006/0246956 A1 | 11/2006 | Park et al. | |
| 2006/0258289 A1* | 11/2006 | Dua | G06F 17/30058 455/41.3 |
| 2007/0022295 A1 | 1/2007 | Little et al. | |
| 2007/0072564 A1 | 3/2007 | Adams | |
| 2007/0083766 A1 | 4/2007 | Farnham et al. | |
| 2007/0180230 A1 | 8/2007 | Cortez | |
| 2007/0180540 A1 | 8/2007 | Little et al. | |
| 2007/0185815 A1 | 8/2007 | Boccon-Gibod et al. | |
| 2008/0172730 A1 | 7/2008 | Sandhu et al. | |
| 2008/0313458 A1 | 12/2008 | Fascenda et al. | |
| 2009/0055643 A1 | 2/2009 | Brown et al. | |
| 2009/0169013 A1 | 7/2009 | Fascenda et al. | |
| 2009/0185677 A1 | 7/2009 | Bugbee | |
| 2009/0228707 A1 | 9/2009 | Linsky | |
| 2009/0265552 A1 | 10/2009 | Moshir et al. | |
| 2009/0268902 A1 | 10/2009 | Fascenda et al. | |
| 2009/0287930 A1 | 11/2009 | Nagaraja | |
| 2010/0020972 A1 | 1/2010 | Baugher et al. | |
| 2010/0124040 A1* | 5/2010 | Diebel | G06F 1/1628 361/816 |
| 2010/0159962 A1 | 6/2010 | Cai et al. | |
| 2011/0117883 A1 | 5/2011 | Drabo | |
| 2011/0138170 A1 | 6/2011 | Fascenda et al. | |
| 2011/0138172 A1 | 6/2011 | McCreight et al. | |
| 2011/0194695 A1 | 8/2011 | Fascenda et al. | |
| 2011/0225417 A1 | 9/2011 | Maharajh et al. | |
| 2012/0054493 A1 | 3/2012 | Bradley | |
| 2012/0212322 A1* | 8/2012 | Idsoe | G06F 21/32 340/5.53 |
| 2012/0239417 A1 | 9/2012 | Pourfallah et al. | |
| 2012/0239560 A1 | 9/2012 | Pourfallah et al. | |
| 2012/0290809 A1 | 11/2012 | Little et al. | |
| 2012/0300932 A1 | 11/2012 | Cambridge et al. | |
| 2012/0308001 A1 | 12/2012 | Arnold et al. | |
| 2013/0030828 A1 | 1/2013 | Pourfallah et al. | |
| 2013/0086375 A1* | 4/2013 | Lyne | H04L 9/00 713/153 |
| 2013/0268437 A1 | 10/2013 | Desai et al. | |

OTHER PUBLICATIONS

Lisonek, David, et al., "SMS Encryption for Mobile Communication," 2008 International Conference on Security Technology, IEEE Computer Society, Dec. 2008, SecTech.2008.48, pp. 198-201.

Office Action dated Jan. 16, 2015, issued in U.S. Appl. No. 13/947,186.

* cited by examiner

METHODS AND APPARATUS FOR LONG-SHORT WAVE, LOW-HIGH FREQUENCY RADIO SECURE MESSAGE SERVICE

CROSS-REFERENCE TO RELATED APPLICATIONS

This application claims the benefit of U.S. Provisional Patent Application No. 61/828,005 filed May 28, 2013, and 61/969,591 filed Mar. 24, 2014. The disclosures of the prior applications are incorporated herein in their entirety by reference.

STATEMENT REGARDING FEDERALLY SPONSORED RESEARCH OR DEVELOPMENT

None.

FIELD

This technology relates to radio communications and to Secure Messaging communications technology using radio waves. More particularly, the technology herein relates to methods, apparatus, and systems for the enablement of sending and receiving encrypted messages over Long/Short Wave, Low, High, Very High, or Ultra High Frequency Radio (LSW/HFR). The technology herein will also provide for an interconnect between the message transmission over LSW/HFR, and other terrestrial or satellite based digital communications systems.

BACKGROUND

Data communications over radio frequencies dates back well over 100 years to a time when Morse code was used for telegraphy and ship to shore communications systems. Some of the earliest "spark gap" transmitters sent a series of dots and dashes over long distances using a broad range of radio frequencies. As vacuum tube technology advanced, so-called "continuous wave" (CW) transmitters were developed that allowed an operator to switch a radio carrier on and off to thereby transmit sequences of letters, numbers and special characters. Such messages were sometimes encrypted.

Many current messaging capabilities over existing LSW/HFR frequencies and associated systems are rooted in these old signaling methods. For example, High Frequency (HF) radio frequencies are between 3 and 30 MHz, also known as the decameter band or decameter wave, as the wavelengths range from one to ten decameters (ten to one hundred meters). The HF band is a major part of the shortwave band of frequencies, so communication at these frequencies is often called shortwave radio. Such radio frequencies have been used for many decades for Morse code as well as radiotelephone (voice) and more recently for data packet radio. Because radio waves in this band can be reflected back to earth by the ionosphere layer in the atmosphere, called "skip" or skywave propagation, these frequencies can be used for long distance communication, at intercontinental distances (1000 Kilometers).

However, as communications technology has evolved, and with the advent of cellular, satellite, or other digital transmission mediums, the use of LSW/HFR for communications has been significantly deemphasized. This can be easily seen with the advent of the Internet, as most individuals or organizations today use either cellular, Wi-Fi, satellite, or other terrestrial based communications mediums for exchanging information with their peers. For example, in the 1980's Phillip Karn developed the KA9Q package to transmit TCP/IP (Internet) base communications over amateur (ham) packet radio on HF frequencies such as used on the 160-meter through 2-meter ham bands (e.g., 1.8. MHz to 148 MHz). Much of this functionality is still available today and has been subsumed into the current day Linux operating system. When this technology was originally developed, security about the exchange of information was not necessarily paramount. Furthermore, given LSW/HFR's relatively low transmission speed as compared to the multi-megabit bandwidth achievable today, this technology has fallen out of favor.

It would be desirable to enable secure messaging over LSW/HFR technology. Consider an event such as natural catastrophe (earthquake, hurricane, tornado, tsunami, etc.). Many of today's technologies rely on large infrastructure components such as cellular base stations or network interconnects to enable the flow of data between each of the end nodes. In the case of a natural disaster, these infrastructure components can be easily compromised, or taken out of service because access to power or data interconnect services have been interrupted.

Therefore, there is a need to provide a solution that enables the exchange of secure messages between peers that interfaces with common off the shelf components (COTS), and does not need to depend upon regional or local infrastructure. Alternatively, this same solution may enable an "off grid" path for the exchange of secure messages where privacy over third party controlled infrastructure is not achievable.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EMBODIMENTS

Example features and platforms described herein support an exemplary LSW/HFR Secure Message Service providing point to point (peer to peer) radio communications over a range of frequencies including shortwave or HF frequencies from 3 to 30 MHz or over wider ranges from 1 MHz to 300 MHz without requiring use of intermediate repeater or other infrastructure.

Secure messaging systems known as etherSMS® and its companion application, Protected Mobility's SMS/MMS computer program, establish a system and method for the delivery of messages over existing terrestrial and satellite base network infrastructure. These commercially available computer applications enable the cryptographically-sound exchange of messages between registered peers over existing short/multimedia messaging services provide by many cellular and or network service providers. See for example the following pending US patent applications incorporated herein by reference:

Ser. Nos. 12/940,213; 13/328,706; 13/670,925; 13/670,994; 13/671,054; 13/671,026; 13/913,765; and 13/974,186.

Some commercial implementations rely on existing infrastructure provided by the cellular or network service providers to carry digital information between the communicating peer systems.

To provide an alternative to such reliance on the cellular or network service provider, common off-the-shelf LSW/HFR components can be assembled to enable data communications directly between peers over alternative frequencies using point-to-point or other communications.

For example, there is a class of applications that are very popular today that comprise the exchange of short to medium size messages—for instance, zero to a few megabytes in size. As an exemplary illustration, consider Protected Mobility's SMS/MMS application, or Twitter's service of sending 140 byte messages. Each of these technologies enables peers to exchange short messages. In some instances where access to network infrastructure is either inconvenient or inaccessible, the use of LSW/HFR to carry this payload would be useful. Therefore it would be helpful to develop a system where the transfer or reception of this payload could be routed over a LSW/HFR bearer automatically or based on user selectable settings. It would be further desirable to allow for the LSW/HFR bearer to be accessible by COTS systems such as a smart handheld device (Smartphone, tablet, etc.) (SHD) or other computer based system.

Figure 1:
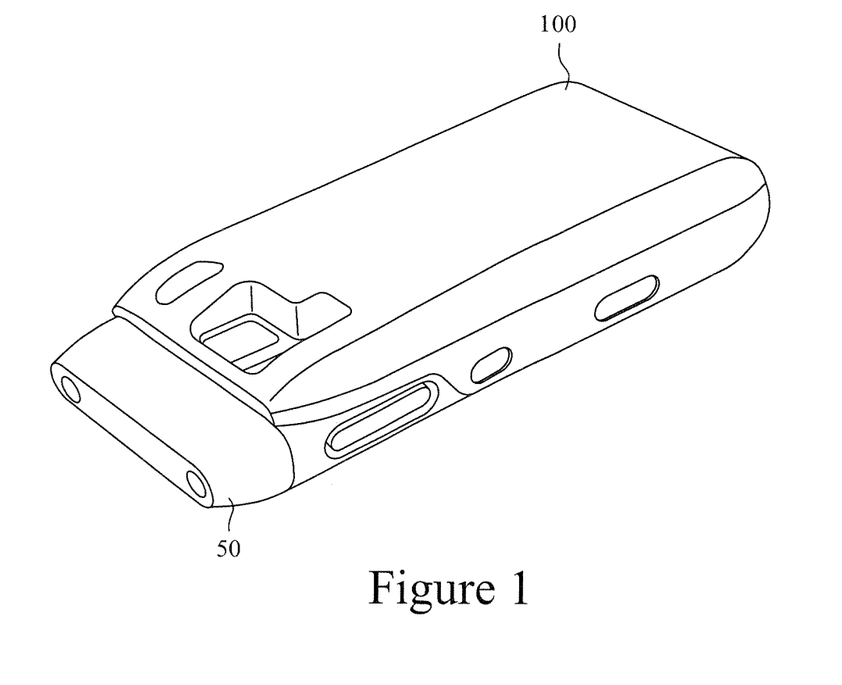
FIG. 1 shows an example non-limiting device.

FIG. 1 is a non-limiting exemplary illustration of an auxiliary device (item 100) such as what is commonly referred to as a backpack, sleeve, or sled that attaches to an existing SHD (item 50) to add additional LSW/HFR messaging technology to the SHD. Such an SHD 50 may have built-in WiFi, Bluetooth, 3G and other ultra high frequency communications interfaces. Aspects of the example non-limiting technology herein supplement such capabilities by providing a further or alternative lower frequency radio path that can be used for communications.

By using the SHD 50 as the Human Machine Interface (HMI), a user will continue to have the ability to create, capture, and/or consume message content through an interface and with applications they are familiar with. The auxiliary device 100 can provide the necessary interfaces needed to take the authored message, and transfer the payload over the LSW/HFR radio interconnect. The auxiliary device 100 may also be loosely coupled to the SHD 50 and provide access to its interfaces using other wireless services such as Near Field Communications (NFC), Bluetooth, or wired interconnects such as a USB port, audio jack, etc., as commonly understood in the art.

Potentially for some covert operations, the LSW/HFR auxiliary device 100 may be disguised as an ordinary and widely available external battery case (or battery "backpack") for mobile phones. In one exemplary embodiment, the LSW/HFR auxiliary device 100 will house the transceiver's hardware, power supply, and support connectivity to the SHD 50.

Figure 2:
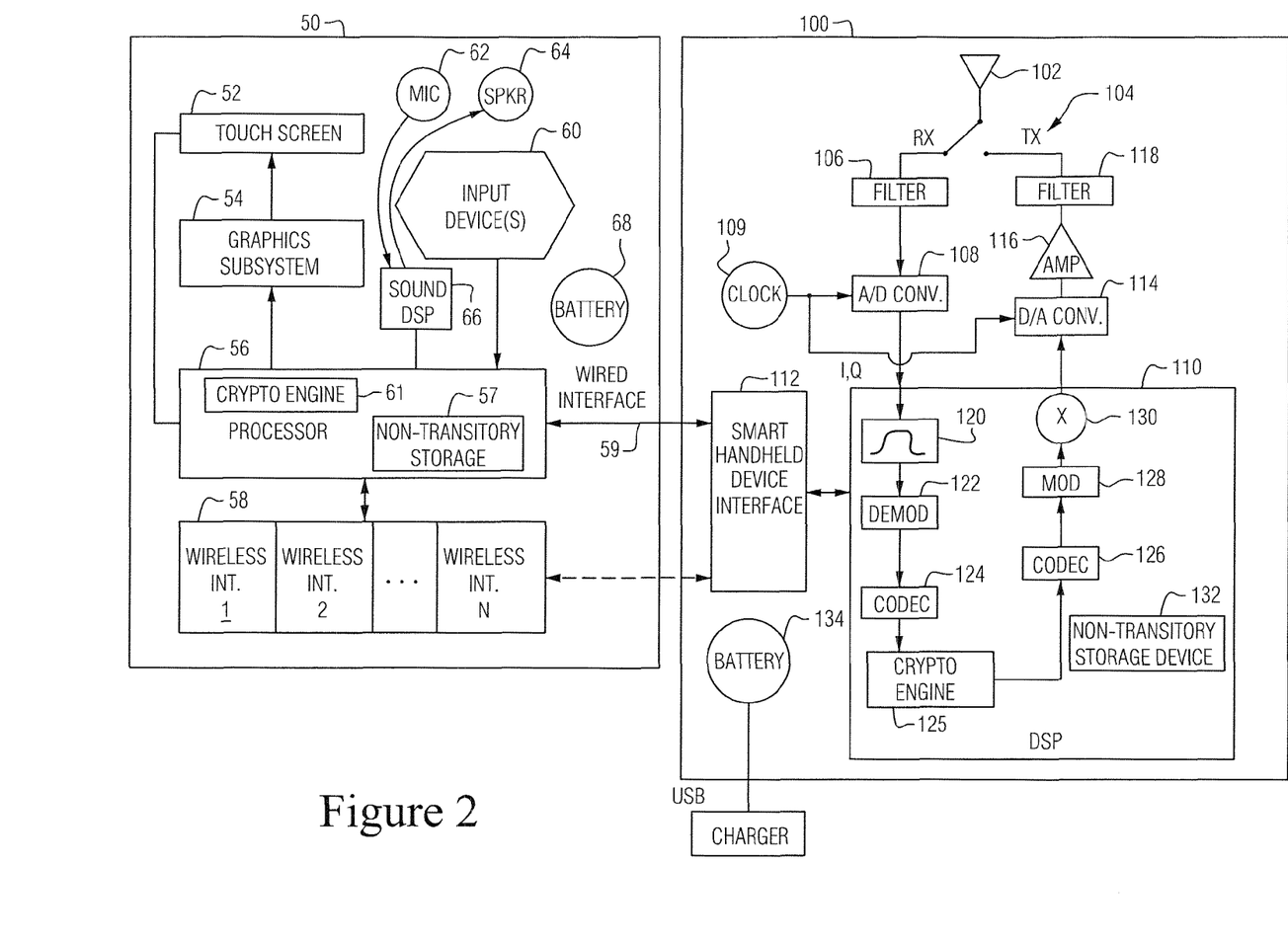
FIG. 2 shows an example non-limiting block diagram for the architecture of the FIG. 1 device.

FIG. 2 shows a block diagram of an example non-limiting smart handheld device 50 coupled to an auxiliary device 100. In the example shown, smart handheld device 50 is a conventional smart phone, tablet, personal computer, or any other type of computing device. Smart handheld device 50 can include, for example, a touchscreen 52 coupled to a processor 56. In the example shown, processor 56 executes program instructions (i.e., software) stored in a non-transitory storage device 57.

In this particular example, a sound or audio digital signal processor (DSP) 66 is coupled to processor 56. Audio DSP 66 in turn may be coupled to a microphone 62 and a speaker 64. Additional input devices 60 such as switches, knobs, and the like provide additional input from the user to processor 56.

The processor may also be coupled to various wireless interfaces 58 such as Bluetooth®, WiFi (802.11), cellular GSM, NFC and/or any other wireless communications interfaces and/or protocols. In the example shown, the smart handheld device 50 also includes a wired interface 59. In this particular example, the auxiliary device 100 communicates with processor 56 via the wired interface 59 and/or one of the wireless interfaces 58 (e.g., Bluetooth).

In this particular example, auxiliary device 100 comprises a high frequency and/or very high frequency radio transceiver including an antenna 102 and a transmit/receive switch 104. When in the receive connection (Rx), the antenna 102 is connected to an input filter 106 an output of which is provided to an analog-to-digital converter 108 clocked by a clock circuit 109. Such direct conversion generates (e.g., using a Tayloe detector) I,Q Quadrature output signals that are applied to a digital signal processor (DSP) 110. In some embodiments, the digital signal processor 110 may be the audio DSP 66 or other DSP within the smart handheld device 50 in order to reduce the cost and/or complexity of auxiliary device 100. In other example non-limiting arrangements, the auxiliary device 100 may include its own digital signal and/or other processor 110.

For transmitting, digital signal processor 110 generates a digital output signal that is applied to a digital-to-analog converter 114 that converts the digital signal to analog form. An RF driver or amplifier 116 amplifies this analog signal. Filter 118 such as a tank circuit eliminates harmonics before the amplified signals are applied to antenna 102 via the transmit/receive switch 104.

In the example non-limiting implementation, digital signal processor 110 is programmed by instructions stored in non-transitory storage device 132 to provide various receive and transmit software defined functions such as filtering 120, demodulation 122, receive codec 124, transmit codec 126, modulator 128, and up-converter 130. In other example implementations, all of these functions may be performed by the one or more components that are part of the smart handheld device 50. In other example implementations, the receive and transmit functions shown in FIG. 2 block 110 may be performed by conventional analog and/or digital hardware such as one or more transceiver integrated circuits, a programmable logic arrays or programmable gate arrays, or a hardware-implemented DSP.

In example non-limiting implementations, the SHD 50 runs an app (stored in storage 57 and executed by processor 56) including a driver that can interface with the hardware and software interface presented by auxiliary device 100 to provide both control and data interface. For example, using this app and an associated user interface that employs the SHD display 52 and other components of the SHD, the SHD can select or control the particular frequency or frequencies on which auxiliary device 100 operates, control the operating state of the auxiliary device (on, off, transmit, receive, etc.) and display information concerning the status of the auxiliary device and/or the information it is transmitting and/or receiving. If it has appropriate permissions (e.g., supervisory), the app may also integrate data received by the auxiliary device 100 with data received by other SHD interfaces 58 so that data received over lower or alternative frequencies is handled seamlessly by the SHD 50 in the same way that the SHD handles data received over other interfaces such as WiFi, Bluetooth, NFC and/or cellular.

In general, it is desirable to implement the auxiliary device 100 as simply and inexpensively as possible. For this purpose, the transmit/receive switch 104 and various analog circuitry as well as the converters, 108, 114, can be implemented with a single chip such as manufactured by Analog Devices, Qualcomm or various other manufacturers. Antenna 102 is preferably an internal antenna, although it may be an external antenna that is coupled to the auxiliary device 100 via a BNC, coaxial or other appropriate connector. For example, in some implementations, antenna 102 could be a long wire, dipole, vertical whip or other suitable antenna tuned to the particular frequency or frequencies for transmission. As mentioned above, in some implementations, digital signal 110 can be implemented using one of the DSPs (e.g., 66) on board the smart handheld device 50 to eliminate complexity and reduce parts count of the auxiliary device 100.

In some applications, auxiliary device 100 may be disguised as a conventional outer case and/or extra battery for the smart handheld device 50. In this particular implementation, auxiliary device 100 may include an additional battery 134 that can be recharged using a conventional charger connected to a USB or other well-known interface. Battery 134 may then provide supplemental power to smart handheld device 50. In other implementations, the auxiliary device 100 is powered by the smart handheld device 50 via the internal battery 68 of the smart handheld device.

Figure 3:
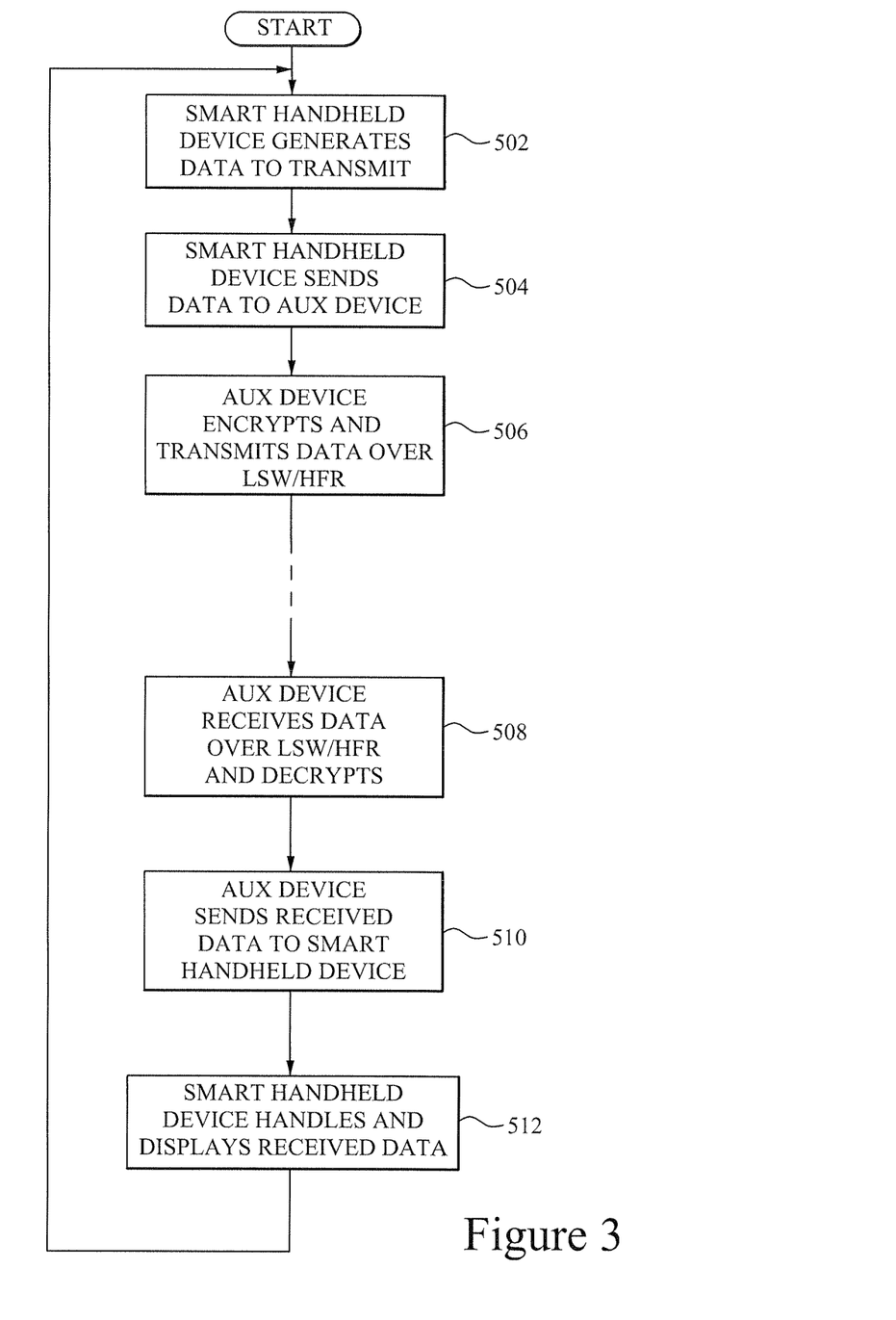
FIG. 3 shows an example non-limiting process.

In operation, smart handheld device 50 generates an output to be transmitted via auxiliary device 100 over an alternative radio frequency channel (FIG. 3 block 502). The example shown, one or more applications "apps" stored in SHD non-transitory storage 57 and executed by smart handheld processor 56 directs the digital or analog information to be transmitted by auxiliary device 100 to the smart handheld device interface 112 of auxiliary device 100 via the wired interface 59 and/or an associated wireless interface 58 (FIG. 3 block 504). Upon receipt, the auxiliary device 100 applies the information to be transmitted (FIG. 3 block 506) to crypto engine 125 (if not already encrypted) on codec 126 for generation of an appropriate encrypted, encoded digital signal to be modulated by modulator 128, applied to an appropriate high frequency signal (e.g., using direct digital conversion and FFT algorithms), and then converted to analog form by D/A converter 114 for amplification, filtering and transmission by the antenna 102. For receiving (FIG. 3, block 508), smart handheld device processor 56 may control the transmit/receive switch 104 to couple antenna 102 to the receiver filter 106, the A/D converter 108 and the internal software defined receiver 120, 122, 124, 125 to receive, demodulate, decode and decrypt information (FIG. 3 block 510) that the auxiliary device 100 then provides via interface 112 to the smart handheld device processor 56 (FIG. 3 block 512).

To provide security, it is desirable in many non-limiting implementations to encrypt data before transmission. As discussed above, a crypto engine or other cryptographic component can be used to provide such encryption (and corresponding decryption). Encryption/decryption can be performed in auxiliary device 100, in SHD 50, or both. For example, if desired, encryption and decryption can be performed within SHD 50 (see crypto engine 61) to provide end-to-end encryption and additional encryption can be performed in auxiliary device 100 (see crypto engine 125). For example, it may be desirable to encrypt different layers of the communications protocol such as network layer encryption and apply additional encryption within application layer communications such as SMS or other short messaging). Additionally, it may be desirable to encrypt communications between the SHD 50 and the auxiliary device 100 to prevent an attacker from eavesdropping on the data communications between those two devices. In still other non-limiting implementations, cost or other reasons may lead to a system where encryption is performed in SHD 50 and not auxiliary device 100, or in auxiliary device 100 and not in SHD 50. In any case, the system is designed and configured so that the relevant crypto engine 61, 125 has access to appropriate cryptographic keys, certificates, shared secrets and other information useful for implementing desired secure cryptographic communications protocols. In some example implementations, such secure information can be protected by tamper-resistant hardware and/or software to prevent attackers from accessing it and producing clone devices. Any desired cryptographic algorithms can be used such as Public Key cryptography, block and/or chain ciphering, secure channels, etc. See e.g., Schneier et al., Cryptography Engineering: Design Principles and Practical Applications (Wiley 2010), incorporated herein by reference.

It is possible for the auxiliary device 100 to monitor a single frequency or scan a number of frequencies to detect incoming message data or voice calls, and to interrupt the SHD processor 56 that data has been received and is ready to be processed. Depending on the algorithms chosen, the message data or voice communications may be spread across multiple frequencies, or hop between frequencies in an agreed upon sequence. In various example non-limiting implementations, transmission and reception can be full duplex, half duplex or simplex.

In one exemplary embodiment, FIPS compliant algorithms may be used to encipher the communications between the backpack and the SHD as well as between communicating peers. The cipher payload may then be communicated using Continuous Wave (CW) methodology using Phase Shift Keying encoding such as for example PSK31 (http://aintel.bi.ehu.es/psk31.html). Alternative encoding and methodologies would be easily apparent to those skilled in the art.

While communicating these payloads between peers on a point-to-point basis is helpful, in its secure operating mode, it is possible to enable private group or broadcast messaging between cooperating peers, assuming each participant has the appropriate cryptographic credentials to encipher and decipher messages.

Figure 4:
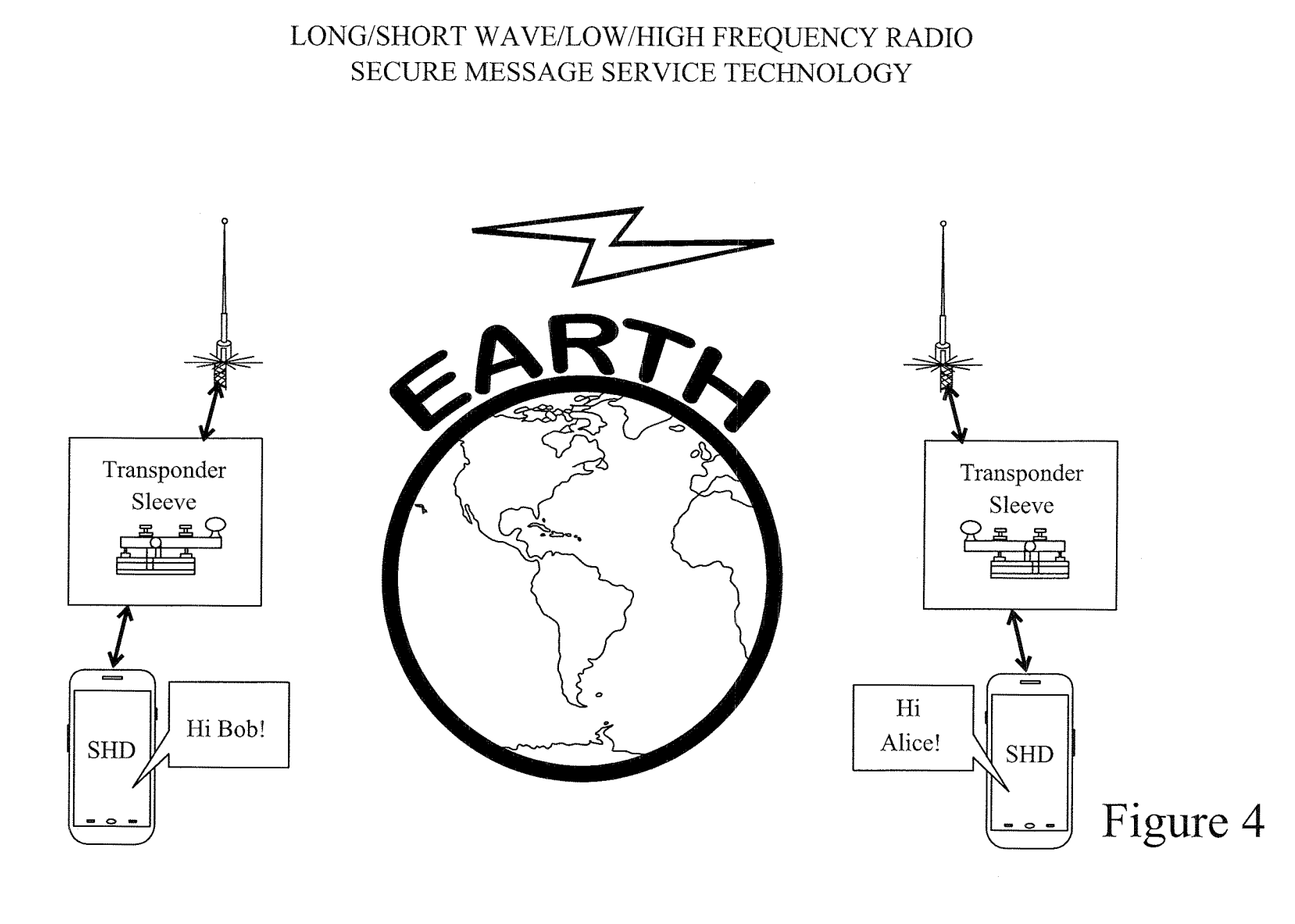
FIG. 4 shows example non-limiting Long/Short Wave/Low/High Frequency Ratio Secure Message Service Technology.
Figure 5:
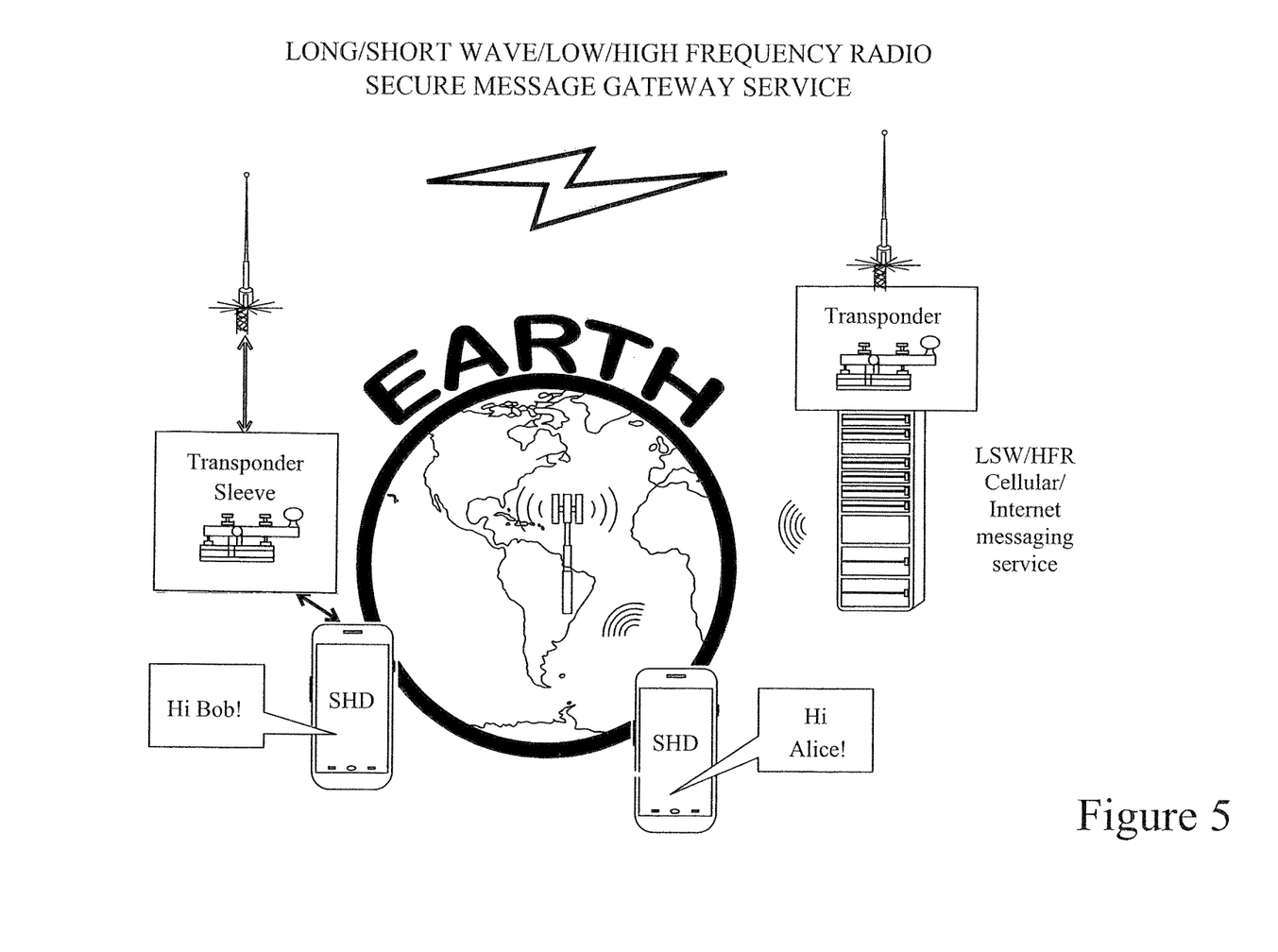
FIG. 5 shows example non-limiting Long/Short Wave/Low/High Frequency Ratio Secure Message Gateway Service.

The example non-limiting technology also allows for a bridge or gateway system to be designed to allow the exchange via other peers that are not currently using a transponder tuned to the LSW/HFR frequencies. See FIGS. 4 and 5. In one exemplary embodiment, the "skip" phenomenon discussed above allows for a gateway or bridge infrastructure component to be located at significant distances from where the LSW/HFR peers are communicating. Consider the natural disaster scenario as described above, where access to local or regional network services may not be available for weeks or months on end. In situations such as these, important correspondence can still occur using a bridge or gateway facility as provided by services such as etherSMS®. In one illustrative embodiment, using the gateway services, peers that are corresponding over the LSW/HFR would be able to send to and/or receive information from others that are using other SMS/MMS, twitter, email, etc., services over cellular, satellite, or other terrestrial base network interconnects.

Other exemplary scenarios where secure peer-to-peer LSW/HFR communication would be useful are:
- Military and governmental communication systems
- Aviation air-to-ground communications
- Amateur radio
- Shortwave international and regional broadcasting
- Maritime sea-to-shore services
- Global Maritime Distress and Safety System (GMDSS) Communication
- Machine-to-Machine communication It is to be understood that the LSW/HFR transponder and associated software/firmware/hardware may be entirely integrated into the SHD or manufactured into separate but loosely coupled components.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A long distance wireless communications device for use with a handheld wireless communications device of the type designed for wirelessly communicating short messaging using short-wavelength wireless infrastructure using the handheld wireless communications device short messaging capability, the long distance wireless communications device comprising:
   a housing that at least partially encases the handheld wireless communications device;
   a data interface disposed in the housing, the data interface configured to interface with the handheld wireless communications device short messaging capability, the data interface being operatively coupled to a high frequency (HF) radio communications transceiver, the data interface being configured to enable the handheld wireless communications device to communicate a short message via the high frequency radio communications transceiver as another way to exchange the short message the handheld wireless communications device is capable of communicating using the short-wavelength wireless infrastructure;
   the high frequency (HF) radio communications transceiver disposed in the housing and capable of operating in the high frequency (HF) range of 3 to 30 MHz, the high frequency (HF) radio communications transceiver providing short messaging wireless data communications on 3 to 30 MHz for long distance communication, thereby providing alternative, long distance wireless communications of short messaging to/from said handheld wireless communications device.

2. The long distance wireless communications device of claim 1 wherein the transceiver is configured to bypass external intermediate wireless communications infrastructure.

3. The long distance wireless communications device of claim 1 wherein the transceiver is configured to communicate point-to-point with a peer HF wireless receiver without requiring any external short-wavelength infrastructure beyond a peer wireless receiver.

4. The long distance wireless communications device of claim 1 wherein the transmitter transmits the short messaging wireless data communications in encrypted form even when the handheld wireless communications device is not structured to transmit the short messaging wireless data communications over the infrastructure in encrypted form.

5. The long distance wireless communications device of claim 1 wherein the data interface obtains short messaging data from the handheld wireless communications device in clear text and the device further includes a cryptographic component that encrypts the data communications before transmission by the high frequency radio communications transceiver.

6. The long distance wireless communications device of claim 1 wherein the housing comprises a sleeve.

7. The long distance wireless communications device of claim 1 wherein the housing is configured as a conventional outer case and/or extra battery for the handheld wireless communications device.

8. The long distance wireless communications device of claim 1 wherein the housing further contains a rechargeable battery used to power the handheld wireless communications device.

9. The long distance wireless communications device of claim 1 wherein the data interface interfaces with an app executing on the handheld wireless communications device, the app directing data to be sent to the device instead of over wireless communications built into the handheld wireless communications device.

10. The long distance wireless communications device of claim 1 wherein the short messaging comprises SMS text messages.

11. The long distance wireless communications device of claim 1 wherein the short messaging comprises text messages.

12. The long distance wireless communications device of claim 1 wherein the short messaging comprises messages not longer than 140 characters.

13. The long distance wireless communications device of claim 1 wherein the short messaging is user-authored.

14. The long distance wireless communications device of claim 1 wherein the handheld wireless communications device comprises a smart phone that, in response to use input, generates said short messaging in the form of text messages.

15. The long distance wireless communications device of claim 1 wherein the long distance comprises an intercontinental distance.

16. The long distance wireless communications device of claim 1 wherein the long distance exceeds 1000 Km.

* * * * *